Dec. 13, 1960     J. J. SCHLUMBRECHT     2,964,141
HYDRAULIC BRAKE LOCKING DEVICE
Filed Aug. 19, 1957     3 Sheets-Sheet 1
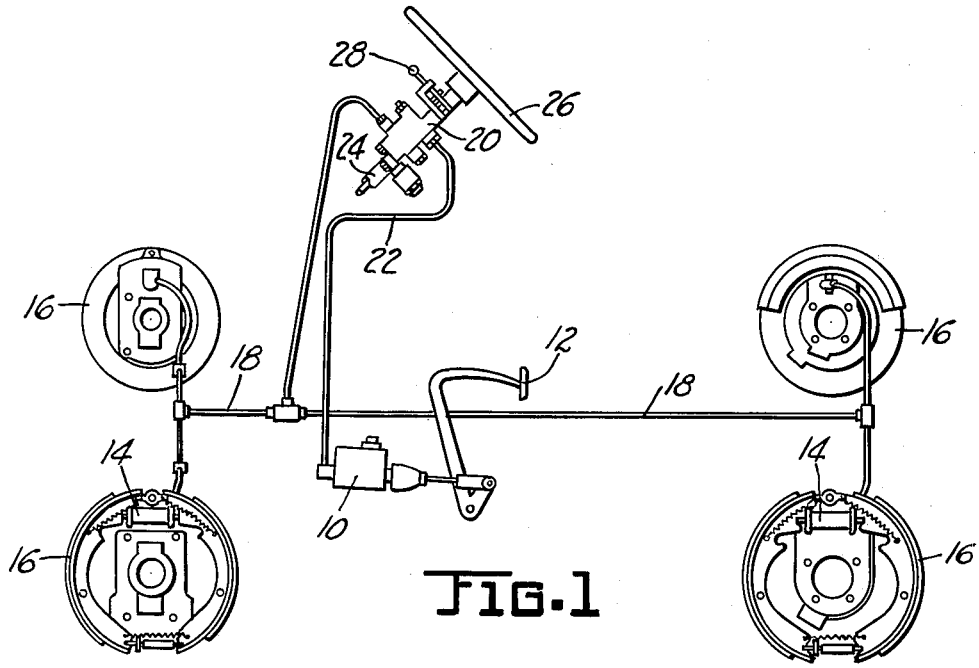
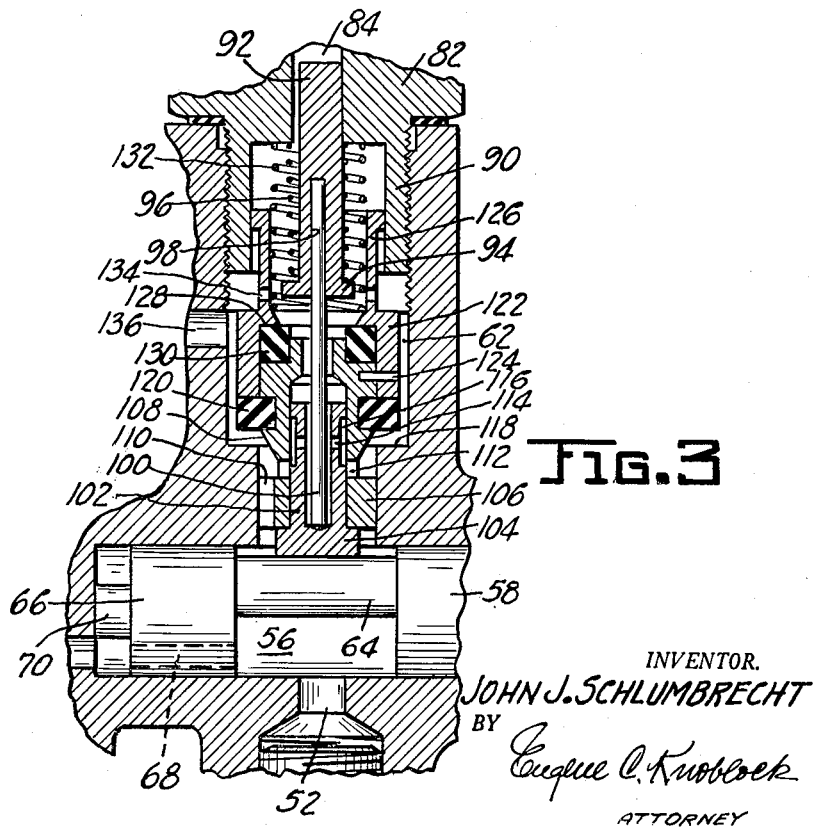
INVENTOR.
JOHN J. SCHLUMBRECHT
BY
Eugene O. Knoblock
ATTORNEY Dec. 13, 1960

J. J. SCHLUMBRECHT 2,964,141

HYDRAULIC BRAKE LOCKING DEVICE

Filed Aug. 19, 1957

INVENTOR.
JOHN J. SCHLUMBRECHT
BY
Eugene C. Knoblock
ATTORNEY

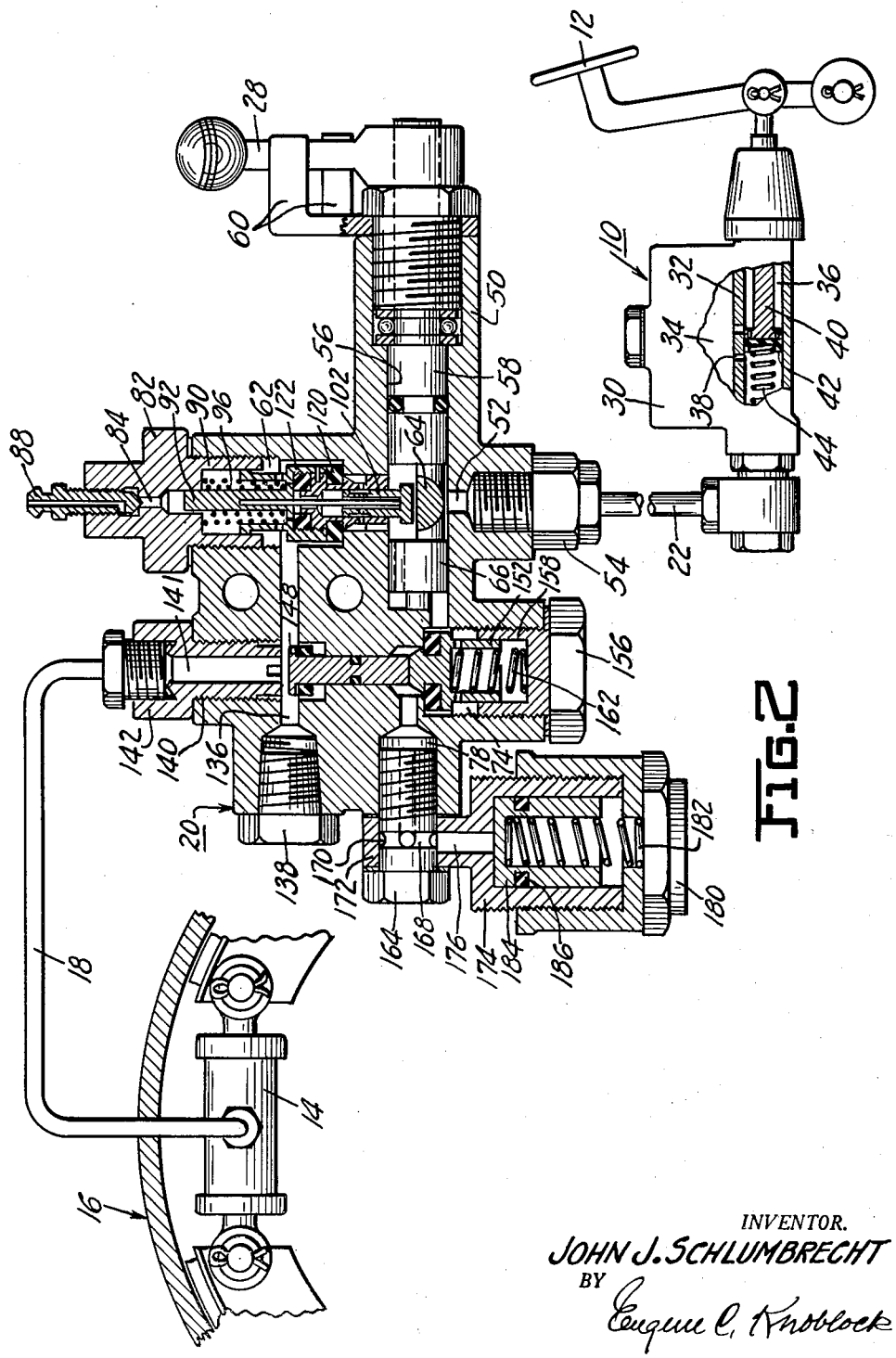

United States Patent Office 2,964,141
Patented Dec. 13, 1960

2,964,141

HYDRAULIC BRAKE LOCKING DEVICE

John Joseph Schlumbrecht, R.R. 3, Three Rivers, Mich.

Filed Aug. 19, 1957, Ser. No. 679,021

10 Claims. (Cl. 188—152)

This invention relates to improvements in hydraulic brake locking devices, by means of which fluid pressure applied to vehicle brakes to energize the same may be confined at the brake to maintain the brakes in set condition without requiring constant depression of the brake actuating pedal.

The primary object of this invention is to provide a device of this character which will permit repeated actuation of a master cylinder while set in brake locking condition without danger of injury to the master cylinder plunger seal.

A further object is to provide a device of this character with a by-pass leading to an expansion chamber wherein said by-pass is normally closed by a spring pressed valve responsive to the pressure in the brakes after initial actuation of the brakes, so that a second actuation of the brake will occur without substantial back pressure during initial movement of the pedal actuated parts.

Other objects will be apparent from the following specification.

In the drawings:

Fig. 1 is a diagrammatic perspective view illustrating my device connected in a hydraulic brake system of a motor vehicle;

Fig. 2 is a longitudinal sectional view taken through the casing of the device, and also illustrating a pedal actuated master cylinder with parts shown in section and a fragment of a vehicle brake;

Fig. 3 is a fragmentary sectional view of the device showing the valve thereof in a different setting than shown in Fig. 2;

Figure 4:
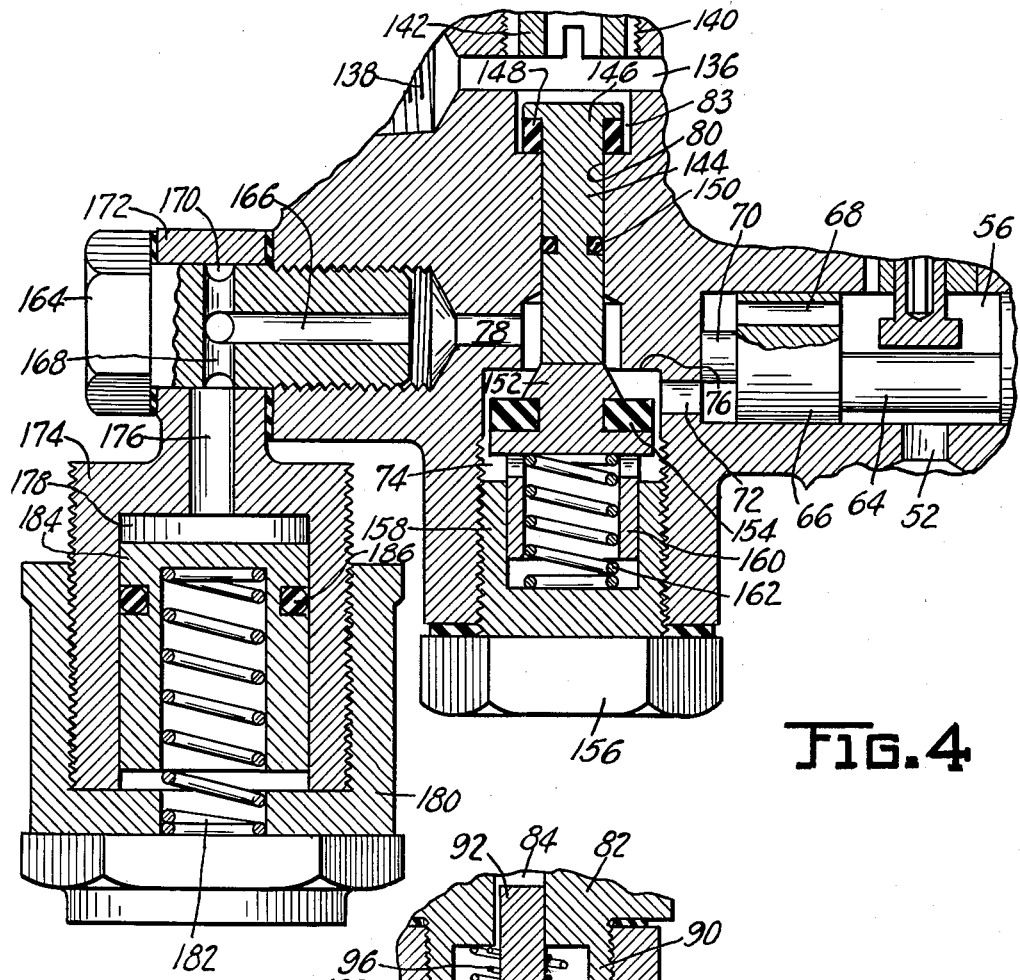
Fig. 4 is a fragmentary enlarged sectional view similar to Fig. 2, illustrating the position of the expansion chamber and the valve leading to the expansion chamber during a second actuation of the master cylinder.

This invention relates to and constitutes an improvement upon the device illustrated in my copending patent application, Ser. No. 361,519, filed June 15, 1953, now Patent No. 2,864,469, for Pressure Locking Unit for Hydraulic Brakes.

Fig. 1 illustrates the hydraulic brake system of a motor vehicle, wherein a master cylinder 10 is connected for actuation by a brake pedal 12 to energize hydraulic actuator means 14 of vehicle wheel brakes 16 which are connected by conduits 18 to my improved device 20 which in turn is connected by conduit 22 with the master cylinder 10. The control member 20 will preferably be mounted on the steering post 24 of a vehicle adjacent to steering wheel 26 so that the operating lever 28 thereof will be readily accessible to the driver of the vehicle.

The master cylinder may be of any suitable construction and includes a housing 30 having a partition 32 therein separating an upper reservoir portion 34 from a lower cylinder portion 36 which are placed in communication at one or more apertures 38 in partition 32. A piston 40 is shiftable in cylinder 36 by operation of the foot pedal 12 and this piston includes a sealing cup 42 formed of rubber or rubberlike material pressed against by a coil spring 44. The cup 42 is adapted to be damaged if the piston 40 is operated against substantial back pressure in line 22 inasmuch as the back pressure expands the cup into the aperture 38 where it is sheared by continued movement of the piston 40 in pressure generating direction.

My locking device has a housing 50 provided with an inlet port 52 with which line 22 communicates by means of suitable fitting 54. The inlet 52 communicates with the intermediate portion of a cylindrical bore 56 within which is rotatably mounted a shaft 58 projecting from the housing and mounting the control lever 28. A pair of spaced stops 60 are preferably carried by the housing 50 to limit the movement of the lever 28. A valve chamber 62 is formed in the housing in communication with passage 56 and preferably in opposed relation to inlet 52. A reduced cam defining offset portion 64 is formed in the shaft 58 opposite to the inlet and the valve chamber to accommodate liquid flow therebetween in all positions thereof. The shaft 58 has an inner end portion 66 provided with longitudinal passage 68 extending therethrough as illustrated in Fig. 4 in off-center position and offset relation to cam 64. A reduced abutment 70 is preferably mounted on the end of shaft portion 66 to bear against the inner end wall of the passage 56 to accommodate flow of liquid from passage 68 to and through a passage 72 leading to a valve chamber 74 having a valve seat shoulder 76 with which is centered a passage 78 and a bore 80.

Figure 5:
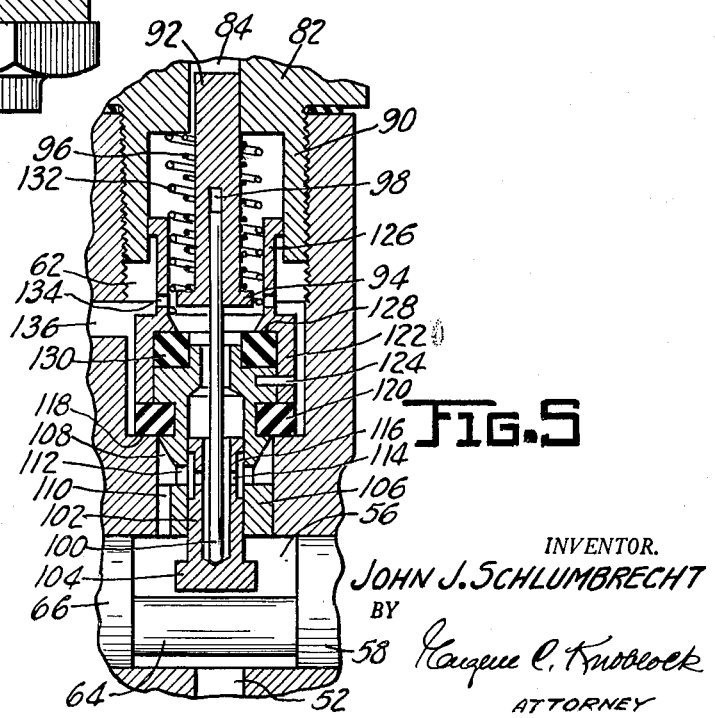
Fig. 5 is a fragmentary view illustrating a position of the control valve of the device different from that shown in Figs. 2 and 3.

A valve is mounted in the passage 62 and preferably is of a construction best illustrated in Figs. 2, 3 and 5. A plug 82 is screw-threaded in the upper or outer end of the chamber 62 and has an axial bore 84 normally closed by member 88 and also has a tubular threaded portion 90 at its inner end. A pin 92 is slidable in bore 84 and has an enlarged valve head portion 94 at its inner end. Coil spring 96 bears at its ends against plug 82 and valve head 94 to normally urge the same downwardly. The pin 92 has the central longitudinal bore 98 within which is slidably received the end portion of a plunger pin 100. The pin 100 seats within the bore of a cup-shaped member 102 having a head portion 104 adapted to be engaged by the cam portion 64 of the shaft 58. An elongated tubular valve member fits slidably within the valve chamber 62 and slidably receives the pin 100 and the cup-shaped member 102. This valve includes an outer tubular portion 106 having a circumferential groove 108 and a passage 110 establishing communication between the bore 56 and the groove 108. A plurality of radial passages or bores 112 communicate with a groove 108 and a plurality of radial passages 114 are formed in a reduced diameter portion 116 of the cup-shaped member 102. The arrangement is such that the bores 112, 114 will normally register as illustrated in Figs. 2 and 5, but will communicate even when out of register, as illustrated in Fig. 3, by reason of the reduced part 116. The valve chamber 62 has a valve seat 118 formed therein intermediate its length. An annular sealing member formed of rubber or synthetic rubber or plastic material 120 seats in a groove in the valve member and is adapted to bear against the valve seat 118, as illustrated in Figs. 2 and 5. A second tubular valve part 122 is anchored to the tubular valve part 106, as by means of a pin 124, and is provided with a reduced portion 126 which fits slidably within the plug sleeve 90. A shoulder 128 formed at the junction of the parts 122, 126 cooperates with the shoulder in the member 106 to provide a seat for a second resilient annular sealing ring 130 which may be formed of rubber, synthetic rubber or plastic material and against which the valve head 94 of the plunger 92 is adapted to bear, as illustrated in Fig. 2. A coil spring 132 encircles the plunger 92 and the head 94 and bears at one end against the plug 82 and at its other end against a shoulder in the portion 126 of the valve. Part 126 of the valve has a plurality of radial apertures 134 formed therein. The valve is characterized by a loose or clearance fit of the pin 100 within the bore thereof, as best seen in Figs. 3 and 5.

A bore 136 communicates with the valve chamber 62 spaced from the valve shoulder 118 and is preferably closed by a plug 138. A cross bore 140 communicates with the bore 136 and is screw-threaded to mount a fitting 142 with which the line 18 leading to the brakes communicates. The bore 140 preferably is substantially axially aligned with the bore 80.

As best illustrated in Fig. 4, a plunger 144 has a snug sliding fit in the passage 80 and projects into the enlarged portion 83 of said passage at a head 146. An annular sealing member 148 fits around the plunger 144 below the head 146 and is adapted to seat against the shoulder between the passage parts 80 and 83. An annular resilient sealing ring, such as an O-ring, 150 seats in a groove circumferential groove in the plunger 144 to provide a seal around the plunger within the bore 80. A valve member 152 seats within the chamber 74 and is encircled by an annular resilient sealing member 154 adapted to seat against the valve seat 76, as illustrated in Fig. 2. A plug 156 is screw-threaded in the socket 74 and preferably has a skirt portion 158 within which is slidably guided a skirt portion 160 of the valve 152. A coil spring 162 is received within the valve skirt portion 160 and bears against the inner end of the plug 156 and normally urges the valve member to sealing position with the valve ring 154 seating at the shoulder 76.

The bore 78 has an enlarged threaded outer end portion within which is secured a machine screw 164 having a central longitudinal passage 166 communicating with the bore 78. A transverse passage 168 communicates with the inner end of the passage 166 and with a circumferential groove 170 on the shank of the screw 164. The groove portion of the screw shank extends within an annular member 172 from which projects a cup-shaped externally screw-threaded member 174. A passage 176 in the member 172, 174 communicates with the groove 170 and the interior chamber 178 of the member 174. A cup-shaped closure member 180 is screw-threaded on the member 174 and provides an abutment for a coil spring 182 which extends into the cavity of inverted cup-shaped member 184 slidable in the chamber 178 and provided with one or more annular grooves receiving O-ring 186 providing a circumferential seal around the cup-shaped plunger member 184. It will be apparent that the chamber 178 is expansible and constitutes a pressure relief chamber.

In the normal operation of a motor vehicle the control lever 28 of the locking device is adjusted in the position illustrated in Fig. 3 with the cam portion 64 of the rock shaft 58 positioned to press the valve 106, 126 in open position with the sealing ring 120 thereof spaced from the valve seat 118. The cup-shaped member 102 urges the pin 100 inwardly to unseat the valve head 94 of the valve plunger 92 from the annular sealing member 130. Movement of the tubular valve body 106, 126 occurs against the resistance of the spring 132, and the movement of the plunger 92 occurs against the resistance of the spring 96. The passage 110 in the valve part 106 permits the free flow of fluid from the inlet 52 across the bore 56 into the valve chamber 62. After passing through the passage 110 fluid flows in chamber 62 around the valve parts 108, 122 to the passage 136 and the passage 141 in the plug 142 to the lines 18 which extend to the pressure responsive members 14 of the wheel brakes 16. Thus upon depression of the pedal 12 and actuation of the master cylinder 10, an unimpeded flow path from that master cylinder to each of the wheel brakes is provided as long as the setting of the control lever 28 remains as illustrated in Fig. 3. It will be apparent that upon release of the pedal 12 fluid may flow back from the brake actuators 14 through the lines 18, bores 141 and 136 to the valve chamber 62 for flow around the valve parts 106, 122 and through the passage 110 thereof and thence across bore 56 and into the inlet 52 for flow through conduit 22 to the master cylinder 10.

When it is desired to set the hydraulic brakes and to lock the same in actuating position, the control lever 28 is shifted to a position wherein the cam 64 of the rock shaft 58 is spaced from the parts of the valve in chamber 62, as illustrated in Fig. 2. In this position of the parts the springs 96 and 132 urge the parts of the valve to closed position, wherein the annular seal member 120 seats on the shoulder 118 and the valve head 94 seats on the annular sealing member 130. When the brake pedal is actuated with the parts in this condition, fluid pressure generated at the master cylinder 10 flows through conduit 22 and inlet 52, across the passage 56, through the passage 110, the groove 108, bores 112 and 114, into the interior of the valve unit 106, 126 for flow to the ports 134 by unseating the valve member 94 against the action of the spring 96. The fluid which flows through ports 134 then flows through passages 136 and 141 to the brake lines 18 and the brake actuators 14. As soon as the actuating pressure is released from the pedal 12, the spring 96 urges the valve head 94 of the plunger 92 to sealing position against the valve seat 130, thereby confining the fluid under pressure within the brakes and holding the brakes actuated.

The enlarged head 146 of the plunger 144 slidable in the bore 80 constitutes a differential area piston which responds to the pressure entrapped in the brake actuators 14, the line 18, and the passages 136 and 141 of the device and acts to press that plunger 144 in a direction to compress the spring 162. As the plunger 144 moves downwardly toward the position illustrated in Fig. 4 against the action of the spring 162, the valve sealing ring 154 is unseated from the valve shoulder 76 and a passage is opened between the bore 56 and the expansible chamber 178. This passage extends from the inlet 52 through bore 56, around the cam 64, through passage 68 to the passage 72, through valve chamber 74, and past the valve to the passage 78, 166, 168 through 170 and passage 176 into the expansion chamber 178.

As a result of a communication opened between the inlet 52 and the expansion chamber 178 as a result of the action of the retained charge of fluid under pressure within the braking system, if a second actuation of the brake pedal 12 is felt necessary to assuredly energize the wheel brakes 16 completely, the initial flow of fluid from the master cylinder 10 occurs in the branch passage mentioned to the expansible chamber 178 until such time as the pressure within the chamber 178 substantially equals the pressure in the brake lines 18, whereupon further actuation of the master cylinder will unseat the plunger 92 against the action of the spring 96 and the fluid pressure brake lines 18 to further charge those brake lines and the brake actuators 14. Thus the initial low pressure or low resistance functioning of the master cylinder will occur at low negligible back pressure so as to avoid expansion of the plunger cup 40 into the port 38. In this way injury to the plunger 42 is obviated and it is possible for an operator to energize a set of locked brakes by two or more pumping operations of the master cylinder.

When the brakes are to be released from a locked position described above, control handle 28 is shifted to shift the valve in chamber 62 to the position illustrated in Fig. 3, whereupon pressure in the line can bleed back from the brakes to the master cylinder, as previously described. At the time the brake pedal 12 is released and while the brakes are still locked under pressure, the spring 182 in the expansible chamber operates to discharge fluid pressure accumulated in the expansion chamber 178. Thus the device is readily restored to normal condition to permit normal functioning of the brakes and their release responsive to the operation of the pedal 12 only.

While the preferred embodiment of the invention has been illustrated and described, it will be understood that changes in the construction may be made within the scope of the appended claims without departing from the spirit of the invention.

I claim:

1. An hydraulic brake locking device adapted to be connected in an hydraulic brake system between a pressure generating brake actuating member and a wheel brake actuator, said pressure generating member including a cylinder and a piston with a relatively soft seal, said cylinder having a filling port near the beginning of the stroke of the piston comprising a housing having a passage therein connecting an inlet and an outlet and a passage branching from said first passage, a manually operable check valve in said first passage between said outlet and said branch passage, a normally closed branch valve in said branch passage, means communicating with said branch passage and defining an expansible chamber, and means responsive to a pressure in said first passage between said check valve and said outlet exceeding the pressure in said branch passage for opening said branch valve to accommodate fluid flow from said pressure generating member to said expansible chamber upon subsequent actuation of said generating member when said manually operated check valve is closed.

2. An hydraulic brake locking device adapted to be connected in an hydraulic brake system between a pressure generating brake actuating member and a wheel brake actuator, said pressure generating member including a cylinder and a piston with a relatively soft seal, said cylinder having a filling port near the beginning of the stroke of the piston comprising a housing having a passage therein connecting an inlet and an outlet and a passage branching from said first passage, a check valve in said first passage between said outlet and said branch passage, a normally closed branch valve in said branch passage, means communicating with said branch passage and defining an expansible chamber, means responsive to a pressure in said first passage between said check valve and said outlet exceeding the pressure in said branch passage for opening said branch valve to accommodate fluid flow from said pressure generating member to said expansible chamber upon subsequent actuation of said generating member when said manually operated check valve is closed, and selectively operable means for maintaining said check valve in open position.

3. An hydraulic brake locking device adapted to be connected in an hydraulic brake system between a pressure generating brake actuating member and a wheel brake actuator, said pressure generating member including a cylinder and a piston with a relatively soft seal, said cylinder having a filling port near the beginning of the stroke of the piston comprising a housing having a passage therein connecting an inlet and an outlet and a passage branching from said first passage, a manually operable check valve in said first passage between said outlet and said branch passage, a normally closed branch valve in said branch passage, means communicating with said branch passage and defining an expansible chamber, said housing having a bore communicating with said first passage between said outlet and said check valve and communicating with said branch passage adjacent said branch valve, and a pressure responsive member shiftable in said bore in response to a pressure in said first passage exceeding the pressure in said branch passage to open said branch valve to accommodate fluid flow from said pressure generating member to said expansible chamber upon subsequent actuation of said generating member when said manually operated check valve is closed.

4. An hydraulic brake locking device adapted to be connected in an hydraulic brake system between a pressure generating brake actuating member and a wheel brake actuator, said pressure generating member including a cylinder and a piston with a relatively soft seal, said cylinder having a filling port near the beginning of the stroke of the piston comprising a housing having a passage therein connecting an inlet and an outlet and a passage branching from said first passage, a manually operable check valve in said first passage between said outlet and said branch passage, a normally closed branch valve in said branch passage, means communicating with said branch passage and defining an expansible chamber, said housing having a bore communicating with said first passage between said outlet and said check valve and communicating with said branch passage adjacent said branch valve, spring means normally urging said branch valve in one direction toward closed position, and a plunger shiftable in said bore between a retracted position and a position responsive to a higher pressure in said first passage than in said branch passage for unseating said branch valve to accommodate fluid flow from said pressure generating member to said expansible chamber upon subsequent actuation of said generating member when said manually operated check valve is closed.

5. An hydraulic brake locking device adapted to be connected in an hydraulic brake system between a pressure generating brake actuating member and a wheel brake actuator, said pressure generating member including a cylinder and a piston with a relatively soft seal, said cylinder having a filling port near the beginning of the stroke of the piston comprising a housing having a passage therein connecting an inlet and an outlet and a passage branching from said first passage, a manually operable check valve in said first passage between said outlet and said branch passage, a normally closed branch valve in said branch passage, means communicating with said branch passage and defining an expansible chamber, said housing having a bore communicating with said first passage between said outlet and said check valve and communicating with said branch passage adjacent said branch valve, spring means normally urging said branch valve in one direction toward closed position, and a plunger shiftable in said bore between a retracted position and a position responsive to a higher pressure in said first passage than in said branch passage for unseating said branch valve to accommodate fluid flow from said pressure generating member to said expansible chamber upon subsequent actuation of said generating member when said manually operated check valve is closed, said plunger having an enlarged head at the end thereof responsive to pressure in said first passage.

6. An hydraulic brake locking device adapted to be connected in an hydraulic brake system between a pressure generating brake actuating member and a wheel brake actuator, said pressure generating member including a cylinder and a piston with a relatively soft seal, said cylinder having a filling port near the beginning of the stroke of the piston comprising a housing having a passage therein connecting an inlet and an outlet and a passage branching from said first passage, a manually operable check valve in said first passage between said outlet and said branch passage, a normally closed branch valve in said branch passage, means communicating with said branch passage and defining an expansible chamber, said housing having a bore communicating with said first passage between said outlet and said check valve and communicating with said branch passage adjacent said branch valve, spring means normally urging said branch valve in one direction toward closed position, and a plunger shiftable in said bore between a retracted position and a position responsive to a higher pressure in said first passage than in said branch passage for unseating said branch valve to accommodate fluid flow from said pressure generating member to said expansible chamber upon subsequent actuation of said generating member when said manually operated check valve is closed, said plunger and said branch valve being substantially axially aligned.

7. An hydraulic brake locking device adapted to be connected in an hydraulic brake system between a pressure generating brake actuating member and a wheel brake actuator said pressure generating member including a cylinder and a piston with a relatively soft seal, said cylinder having a filling port near the beginning of the stroke of the piston comprising a housing having a passage therein connecting an inlet and an outlet and a passage branching from said first passage, a manually operable check valve in said first passage between said outlet and said branch passage, a normally closed branch valve in said branch passage, means communicating with said branch passage and defining an expansible chamber, said housing having a bore communicating with said first passage between said outlet and said check valve and communicating with said branch passage adjacent said branch valve, spring means normally urging said branch valve in one direction toward closed position, and a plunger shiftable in said bore between a retracted position and a position responsive to a higher pressure in said first passage than in said branch passage for unseating said branch valve to accommodate fluid flow from said pressure generating member to said expansible chamber upon subsequent actuation of said generating member when said manually operated check valve is closed, said plunger having a circumferential groove in the portion thereof seated in said bore, and an annular sealing ring seated in said groove and in circumferential sealing engagement with said bore.

8. An hydraulic brake locking device adapted to be connected in an hydraulic brake system between a pressure generating brake actuating member and a wheel brake actuator, said pressure generating member including a cylinder and a piston with a relatively soft seal, said cylinder having a filling port near the beginning of the stroke of the piston comprising a housing having a passage therein connecting an inlet and an outlet and a passage branching from said first passage, a manually operable check valve in said first passage between said outlet and said branch passage, a normally closed branch valve in said branch passage, means communicating with said branch passage and defining an expansible chamber, means responsive to a pressure in said first passage between said check valve and said outlet exceeding the pressure in said branch passage for opening said branch valve to accommodate fluid flow from said pressure generating member to said expansible chamber upon subsequent actuation of said generating member when said manually operated check valve is closed, said check valve comprising a tubular valve body having a pair of annular sealing members, said passage including a valve seat normally engaged by one of said sealing members, and a valve element shiftable axially in said tubular body and normally seating against said second annular sealing member.

9. An hydraulic brake locking device adapted to be connected in an hydraulic brake system between a pressure generating brake actuating member and a wheel brake actuator, said pressure generating member including a cylinder and a piston with a relatively soft seal, said cylinder having a filling port near the beginning of the stroke of the piston comprising a housing having a passage therein connecting an inlet and an outlet and a passage branching from said first passage, a check valve in said first passage between said outlet and said branch passage, a normally closed branch valve in said branch passage, means communicating with said branch passage and defining an expansible chamber, means responsive to a pressure in said first passage between said check valve and said outlet exceeding the pressure in said branch passage for opening said branch valve to accommodate fluid flow from said pressure generating member to said expansible chamber upon subsequent actuation of said generating member when said manually operated check valve is closed, said first passage having a valve seat, said check valve comprising a first valve member normally engaging said seat and having a passage therethrough including a second valve seat, a second valve member carried by said first valve member and normally spring urged against said second valve seat, and control means for selectively positioning said first valve member.

10. An hydraulic brake locking device adapted to be connected in an hydraulic brake system between a pressure generating brake actuating member and a wheel brake actuator, said pressure generating member including a cylinder and a piston with a relatively soft seal, said cylinder having a filling port near the beginning of the stroke if the piston comprising a housing having a passage therein connecting an inlet and an outlet and a passage branching from said first passage, a check valve in said first passage between said outlet and said branch passage, a normally closed branch valve in said branch passage, means communicating with said branch passage and defining an expansible chamber, means responsive to a pressure in said first passage between said check valve and said outlet exceeding the pressure in said branch passage for opening said branch valve to accommodate fluid flow from said pressure generating member to said expansible chamber upon subsequent actuation of said generating member when said manually operated check valve is closed, said first passage having a valve seat, said check valve comprising a first valve member spring pressed in the direction of said inlet to normally engage said seat, said valve member having a passage therethrough including a second valve seat, a second valve member shiftable in said valve passage and spring pressed in the direction of said inlet to normally engage said second valve seat, and selectively operable control means for unseating said first valve member.

References Cited in the file of this patent
UNITED STATES PATENTS
2,780,240   Madak ------------------ Feb. 5, 1957